(12) United States Patent
Devine

(10) Patent No.: US 9,502,188 B2
(45) Date of Patent: Nov. 22, 2016

(54) ADJUSTABLE DOOR ASSEMBLY

(71) Applicant: ABB Inc., Cary, NC (US)

(72) Inventor: Liam Devine, Collierville, TN (US)

(73) Assignee: ABB Inc., Cary, NC (US)

( * ) Notice: Subject to any disclaimer, the term of this patent is extended or adjusted under 35 U.S.C. 154(b) by 0 days.

(21) Appl. No.: 14/921,416

(22) Filed: Oct. 23, 2015

(65) Prior Publication Data

US 2016/0118200 A1 Apr. 28, 2016

Related U.S. Application Data

(60) Provisional application No. 62/068,567, filed on Oct. 24, 2014.

(51) Int. Cl.
H01H 9/02 (2006.01)

(52) U.S. Cl.
CPC .................... H01H 9/0207 (2013.01)

(58) Field of Classification Search
USPC .......................................... 174/50
See application file for complete search history.

(56) References Cited

U.S. PATENT DOCUMENTS

| 2,651,814 | A | * | 9/1953 | Lester, Jr. | ................. E06B 1/08 49/380 |
| 3,906,671 | A | * | 9/1975 | Maldonado | ............... E06B 1/20 49/505 |
| 4,916,265 | A | * | 4/1990 | Luallen | ................ H01H 9/0207 200/294 |
| 5,219,068 | A | * | 6/1993 | Piotrowski | ......... H03K 17/9505 200/296 |

* cited by examiner

Primary Examiner — Dhirubhai R Patel
(74) Attorney, Agent, or Firm — Cooper Legal Group LLC

(57) ABSTRACT

One or more apparatuses are provided for forming a seal between a circuit breaker and an enclosure. An adjustable door assembly includes an inner floating frame assembly positioned according to a floating configuration between a first external flange and a second external flange that connect to an enclosure door of an enclosure housing a circuit breaker. The inner floating frame assembly includes an inner floating frame and an inner floating box frame. An adjustable coupling is used to apply a force, between the inner floating frame and the inner floating frame box, to the inner floating box frame towards a front side of the circuit breaker to form a seal between the front side of the circuit breaker and the enclosure door. The seal may provide a barrier for mitigating arc flash, hazardous gases, material, and/or explosive force from escaping from a backside of the circuit breaker.

20 Claims, 17 Drawing Sheets

ADJUSTABLE DOOR ASSEMBLY

RELATED APPLICATION

This application claims priority to U.S. Provisional Patent Application No. 62/068,567, filed on Oct. 24, 2014 and titled "ADJUSTABLE DOOR ASSEMBLY," which is incorporated herein.

BACKGROUND

Switchgear may be used to control, protect, and/or isolate electrical equipment, and is used in connection with the generation, transmission, distribution, and/or conversion of electric power to such electrical equipment. Switchgear may comprise switching and/or interrupting devices that may be used with control devices, metering devices, protection devices, and/or regulating devices. Switchgear may comprise a circuit breaker. The circuit breaker may comprise a mechanical switching device that is capable of making, carrying, and/or breaking currents. For example, the circuit breaker may make and/or carry current until an abnormal circuit condition occurs, such as a short circuit, upon which the circuit breaker may break a current flow along an electrical bus by transitioning into a disconnected position where electrical contacts of the circuit breaker become disconnected from the electrical bus. The circuit breaker may be racked into various positions, such as a connected position (e.g., a recessed position within an enclosure housing the circuit breaker, such that the electrical contacts of the circuit breaker may connect to the electrical bus for carrying current), a test position, a disconnected position (e.g., the circuit breaker may rack out away from the electrical bus so that the electrical contacts may disconnect from the electrical bus to break current), etc. The racking process, such as transitioning the circuit breaker from the connected position to the disconnected position may result in an arc flash where hazardous gases, material, and/or explosive force may escape through gaps between the circuit breaker and an enclosure door of the enclosure comprising the circuit breaker. Such gaps may result when circuit breakers are upgraded, modified, and/or replaced (e.g., an older circuit breaker may be replaced with a relatively smaller and more compact new circuit breaker, such that installation of the new circuit breaker in an enclosure may result in gaps through which arc flash, hazardous gases, material, and/or explosive force can escape from a backside of the new circuit breaker through the gaps and an enclosure door).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more apparatuses for forming a seal between a circuit breaker and an enclosure door are provided herein. An apparatus comprises an adjustable door assembly. The adjustable door assembly comprises a first external flange configured to attach to an enclosure door of an enclosure that houses a circuit breaker. The adjustable door assembly comprises a second external flange configured to attach to the enclosure door. The adjustable door assembly comprises an inner floating frame assembly that is positioned according to a floating configuration between the first external flange and the second external flange. The inner floating frame assembly comprises an inner floating frame. The inner floating frame assembly comprises an inner floating box frame. The inner floating frame assembly comprises an adjustable coupling configured to apply a force, between the inner floating frame and the inner floating box frame, to the inner floating box frame towards a front side of the circuit breaker to form a seal between the front side of the circuit breaker and the enclosure door. The adjustable door assembly comprises an access opening that provides access to the front side of the circuit breaker when the enclosure door is closed.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
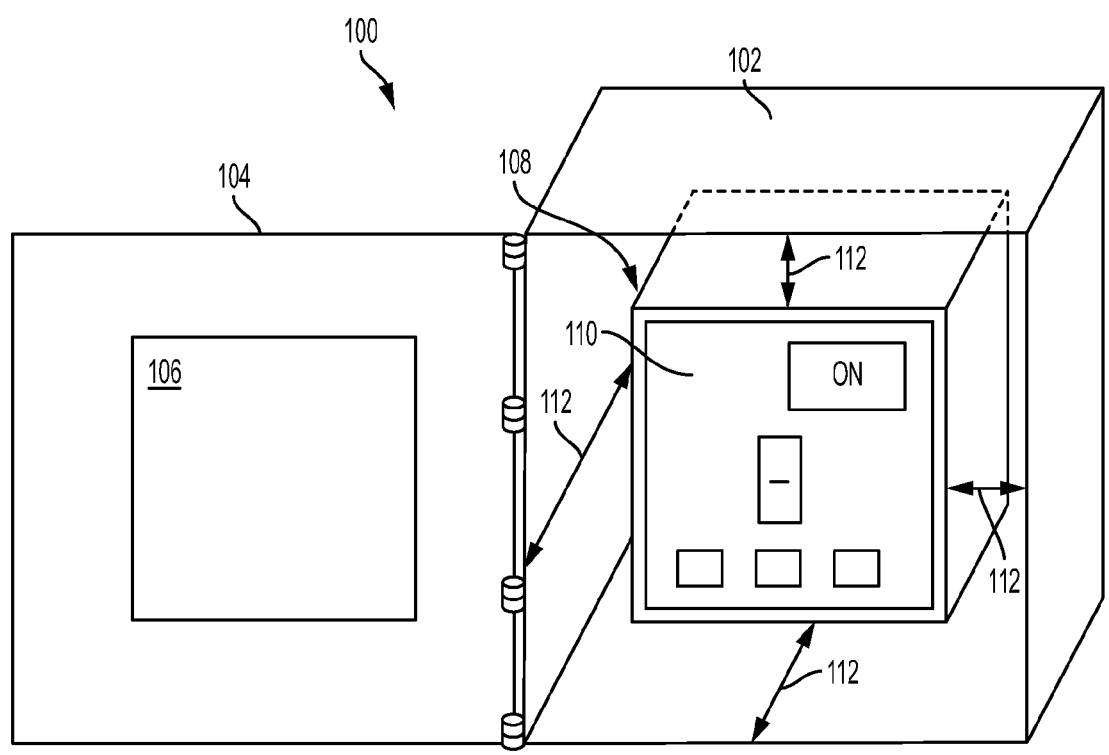
FIG. 1A is an illustration of an example of an enclosure housing a circuit breaker, where an enclosure door is open.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

As provided herein, an apparatus for forming a seal between a circuit breaker and an enclosure is provided. The apparatus comprises an adjustable door assembly that is attached to an enclosure door of the enclosure housing the circuit breaker. The adjustable door assembly comprises an inner floating frame assembly that provides a seal for unwanted gaps between the circuit breaker and the enclosure door. In an example of forming the seal, one or more adjustable couplings (e.g., springs, such as roll springs) of the inner floating frame assembly may apply a force to an inner floating box frame of the inner floating frame assembly towards a front side of the circuit breaker to form the seal. Because the seal is formed against the front side of the circuit breaker (e.g., around a perimeter of the front side of the circuit breaker such that an access opening of the adjustable door assembly may provide access to the front side of the circuit breaker when the enclosure door is closed), the seal mitigates arc flash, material, hazardous gases, and/or explosive force from escaping from behind the circuit breaker through the gaps and the access opening.

The inner floating frame assembly may be configured according to a floating configuration such that the inner floating frame assembly moves in response to movement of the circuit breaker while maintaining the seal (e.g., the seal may be maintained during transitions of the circuit breaker between a connected position, a test position, a disconnected position, and/or other racking positions). The adjustable couplings may allow the inner floating frame assembly to move with respect to the circuit breaker. For example, when the circuit breaker transitions from a recessed position (e.g., the connected position) towards the enclosure door (e.g., to the disconnected position), the inner floating frame assembly may move towards and/or protrude through the enclosure door (e.g., through an opening of the enclosure door within which the adjustable door assembly is installed) to adjust for the circuit breaking moving towards the enclosure door. The seal may mitigate exposure of an operator to arc flash, hazardous gases, and/or other undesirable byproducts of the circuit breaker transitioning between positions (e.g., when electrical contacts of the circuit breaker open to interrupt a large current, there may be a tendency for an arc to form between the opened contacts, which can creative conductive ionized gases, an explosion, and/or molten or vaporized metal).

FIGS. 1A-1D illustrate an example 100 of an enclosure 102 that houses a circuit breaker 108. FIG. 1A illustrates the circuit breaker 108 in a connected position such that the circuit breaker 108 may be recessed within the enclosure 102 (e.g., a switchgear enclosure). While in the connected position, electrical contacts on a backside of the circuit breaker 108 may be in contact with an electrical bus, and the circuit breaker 108 may be carrying current while in the connected position. The enclosure 102 comprises an enclosure door 104. In an example, the enclosure door 104 may comprise an opening 106 through which an operator may access the circuit breaker 108 while the enclosure door 104 is closed. When the circuit breaker 108 is recessed within the enclosure 102 while in the connected position, a gap 112 may be formed between the circuit breaker 108 (e.g., along a front side 110 and sides of the circuit breaker 108) and a front of the enclosure 102 and/or the enclosure door 104 when closed (e.g., the gap 112 may provide an access path for unwanted material, gases, and/or explosive forces to escape from behind the circuit breaker 108 around the sides of the circuit breaker 108 and through the gap 112 and/or through the opening 106 when the enclosure door 104 is closed). Depending on the type of enclosure 102 and/or the type of circuit breaker 108 (e.g., the circuit breaker 108 may comprise a replacement circuit breaker 108 that was not sized according to the enclosure 102 because the circuit breaker 108 may be more compact than an original circuit breaker of the enclosure 102 due to advances in technology allowing for more compact design), the gap 112 may be anywhere between about 0.37 of an inch and about 5 inches or any other size that may allow arc flash, material, gases, and/or explosive forces through the gap 112. Because the circuit breaker 108, the enclosure 102, and/or the enclosure door 104 may be not sized according to one another, gaps and/or misalignment may occur.

Figure 1B:
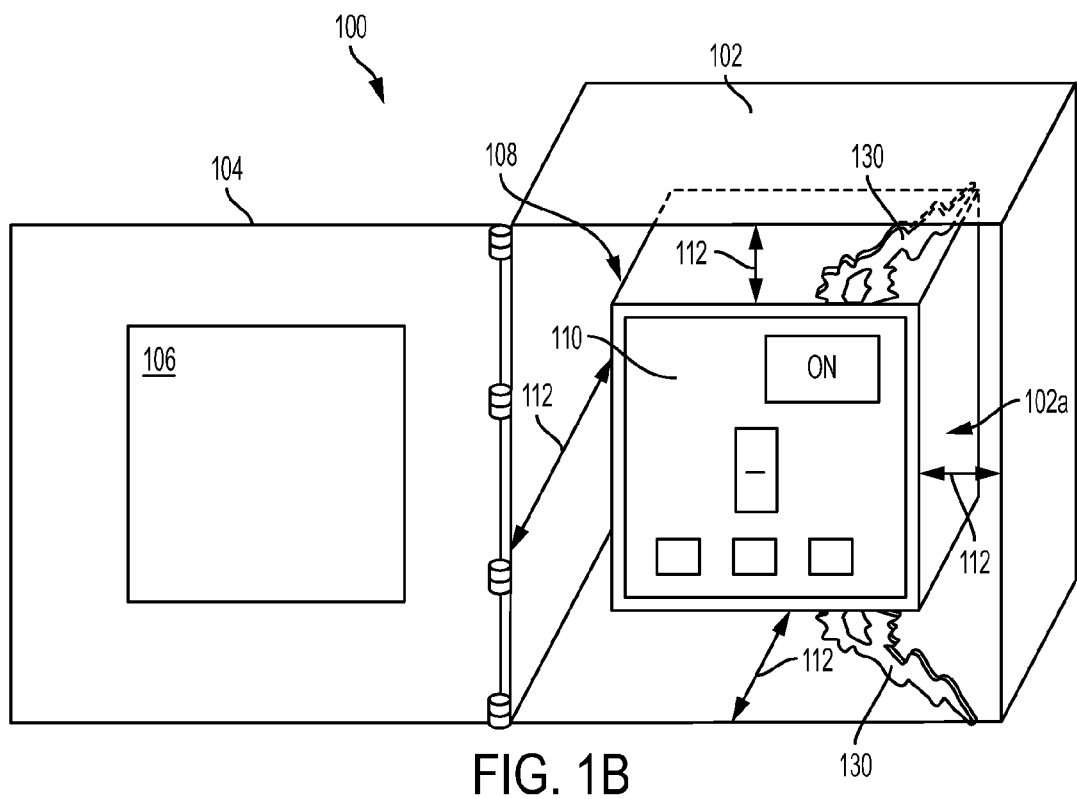
FIG. 1B is an illustration of an example of an enclosure housing a circuit breaker, where an enclosure door is open and an arc flash occurs.

FIG. 1B illustrates an arc flash 130 occurring behind the circuit breaker 108. When the circuit breaker 108 transitions into the disconnected state, the circuit breaker 108 may move towards the front of the enclosure 102 and/or the enclosure door 104 when closed so that the electrical contacts on the backside of the circuit breaker 108 may open to interrupt current flow along the electrical bus through the circuit breaker 108. There may be a tendency for the arc flash 130 to occur between the opened electrical contacts (e.g., current may attempt to continue through the electrical contacts), which may result in conductive ionized gases, molten or vaporized material, and/or explosive forces to escape from the backside of the circuit breaker 108 through the gap 112 resulting in dangerous conditions for an operator and/or damage to other equipment while the enclosure door 104 is open.

Figure 1C:
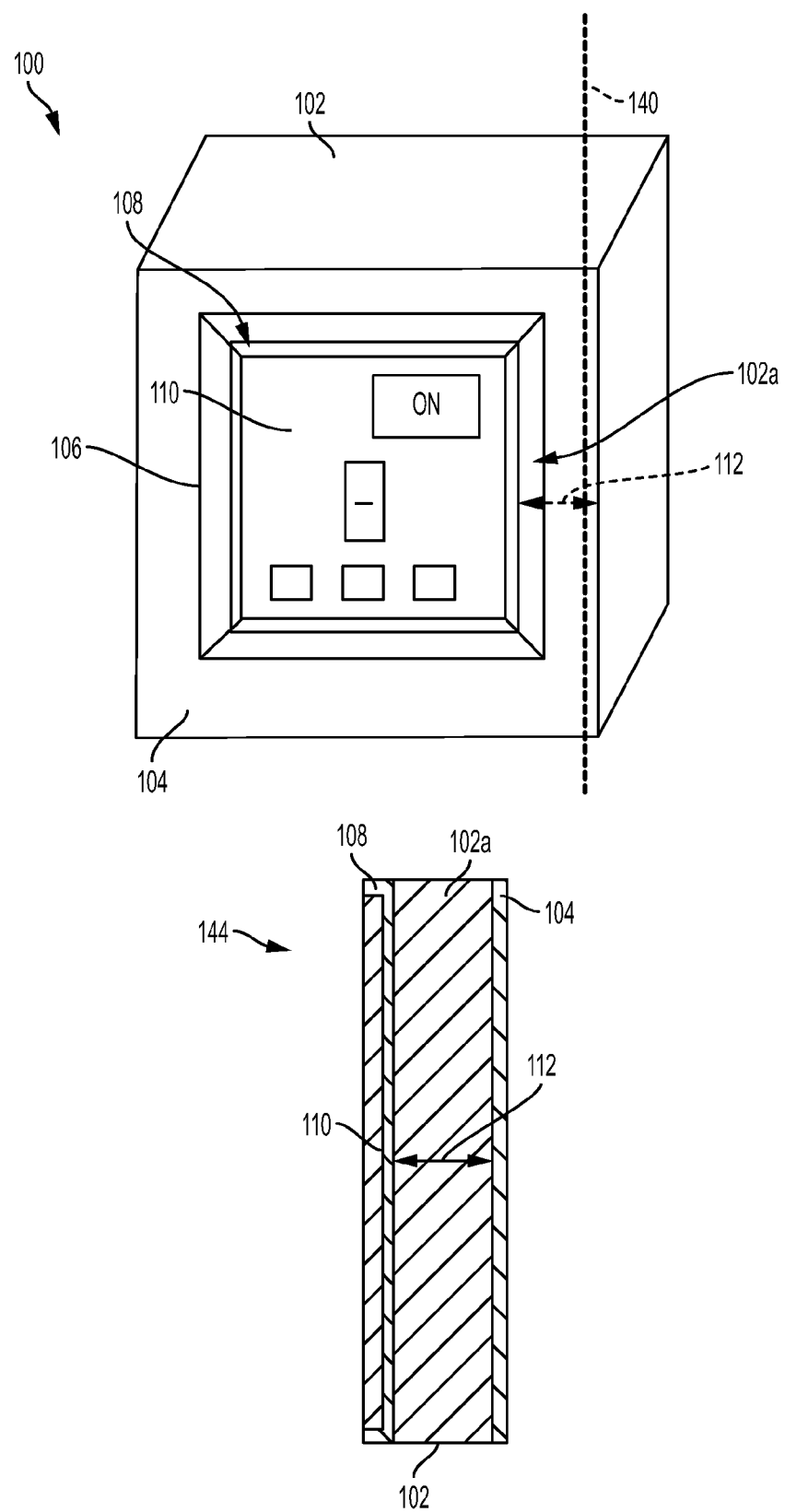
FIG. 1C is an illustration of an example of an enclosure housing a circuit breaker, where an enclosure door is closed.

FIG. 1C illustrates the enclosure door 104 in a closed position with respect to the enclosure 102. The opening 106 may provide access to the circuit breaker 108 while the enclosure door 104 is closed. FIG. 1C illustrates a cross-sectional view 144 of the enclosure 102 taken along a line 140. The cross-sectional view 144 illustrates the gap 112 between the circuit breaker 108 (e.g., along the front side 110 and sides of the circuit breaker 108) and the enclosure door 104. The gap 112 may be along a first inside side portion 102a of the enclosure 102 that extends parallel to a first side of the circuit breaker 108 to the backside of the circuit breaker 108.

Figure 1D:
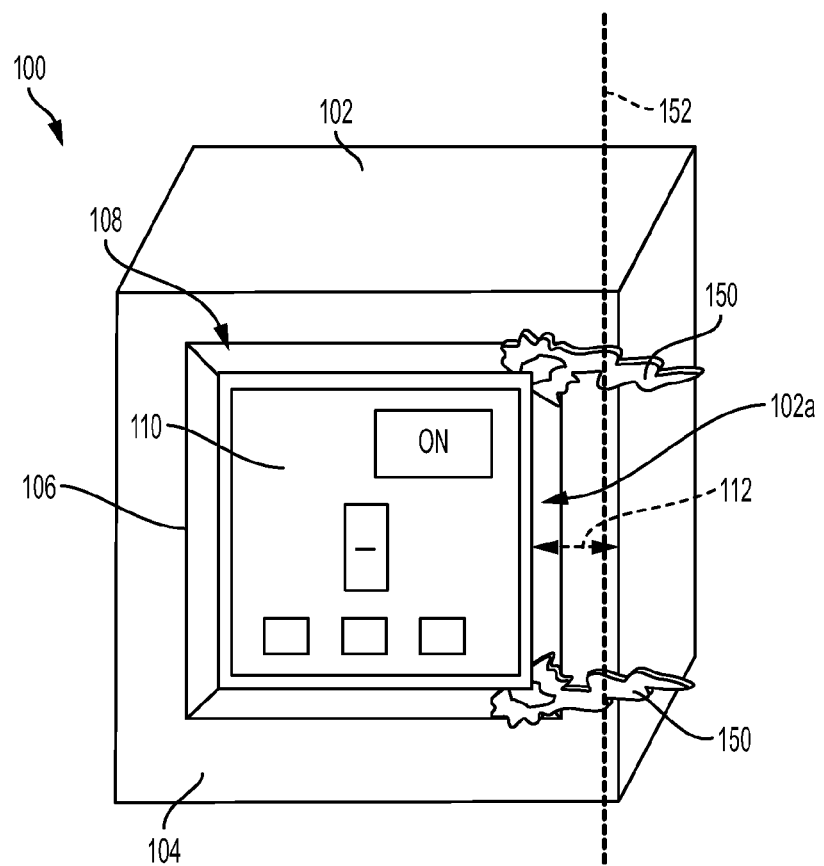
FIG. 1D is an illustration of an example of an enclosure housing a circuit breaker, where an enclosure door is closed and an arc flash occurs.
Figure 1D:
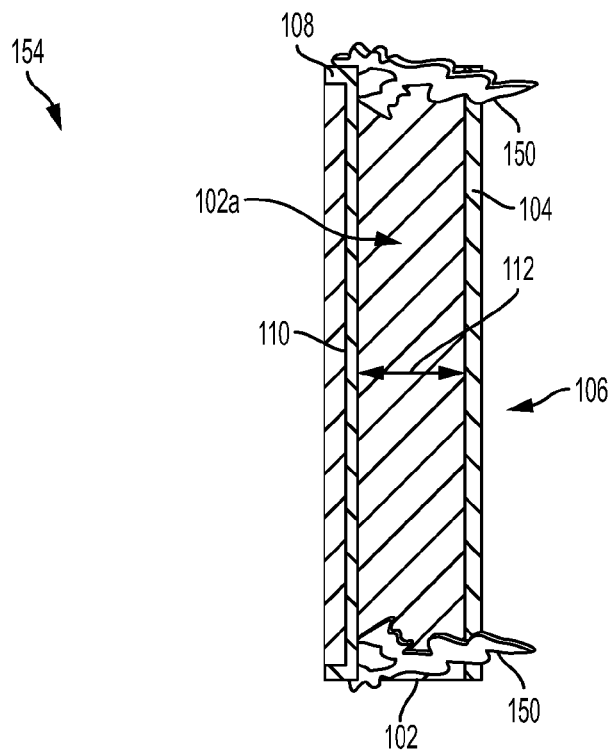

FIG. 1D illustrates an arc flash 150 occurring behind the circuit breaker 108 while the enclosure door 104 is closed. The arc flash 150 may result in conductive ionized gases, molten or vaporized material, and/or explosive forces escaping from the backside of the circuit breaker 108, through the gap 112 (e.g., that is between the first side of the circuit breaker 108 and the first inside side portion 102a of the enclosure) and out the opening 106 resulting in dangerous conditions for an operator and/or damage to other equipment while the enclosure door 104 is closed. FIG. 1D illustrates a cross-sectional view 154 of the enclosure 102 taken along a line 152. The cross-sectional view 154 may illustrate the gap 112 between the circuit breaker 108 and the enclosure door 104. The gap 112 may be along the first inside side portion 102a of the enclosure 102. The cross-sectional view 154 illustrates the arc flash 150, such as the conductive ionized gases, material, and/or explosive forces, escaping from the backside of the circuit breaker 108 and outside of the enclosure 102 through the gap 112 and the opening 106.

Figure 2A:
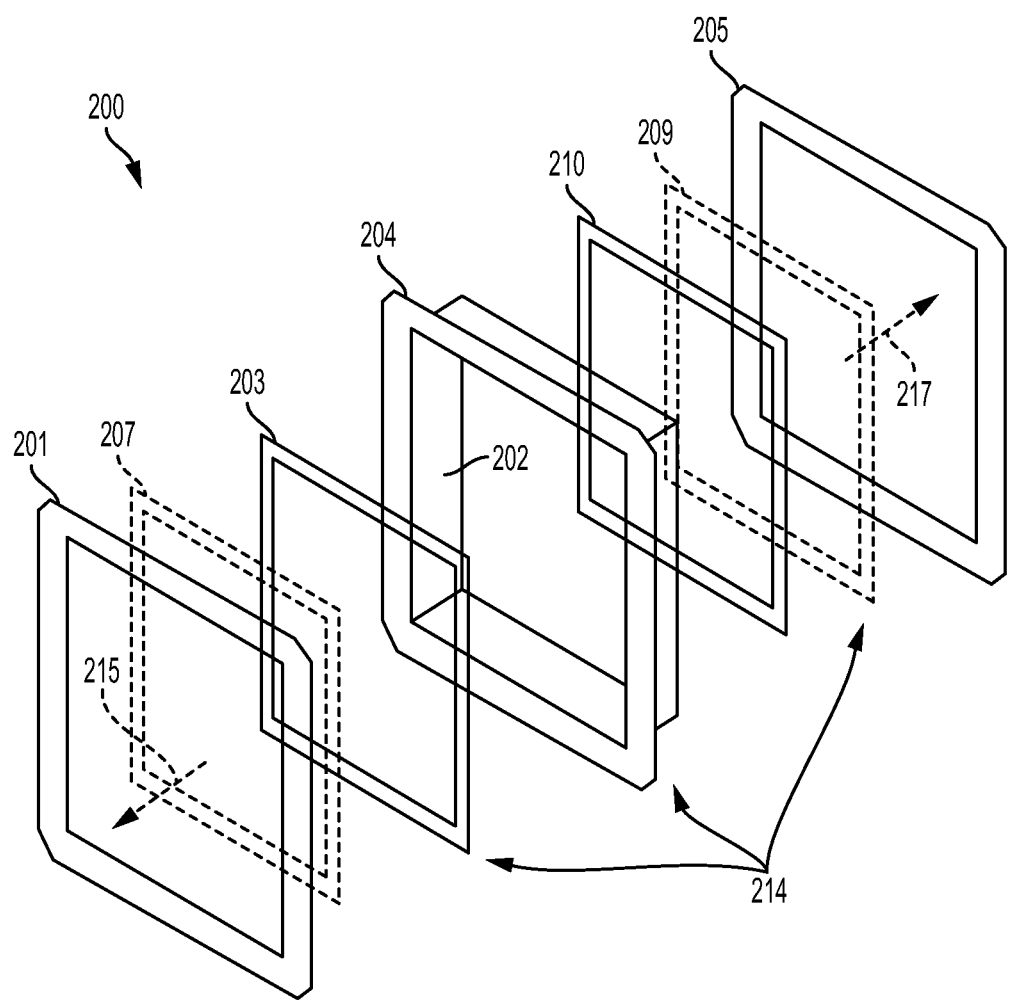
FIG. 2A is an illustration of an apparatus for forming a seal between a circuit breaker and an enclosure door.

FIG. 2A illustrates an example of an adjustable door assembly 200 for forming a seal between a circuit breaker and an enclosure door, such as the circuit breaker 108 and the enclosure door 104 of the enclosure 102. The adjustable door assembly 200 may be comprised of a metal material (e.g., sheet metal that may attach to the enclosure door 104 using one or more bolts, such as butterfly bolts, or any other attachment), a polymer material (e.g., a polycarb material), or any other suitable material. The adjustable door assembly 200 comprises a first external flange 205 configured to attach to the enclosure door 104. The adjustable door assembly 200 comprises a second external flange 201 configured to attach to the enclosure door 104 (e.g., the second external flange 201 may directly mount against the enclosure door 104). The adjustable door assembly 200 comprises an inner floating frame assembly 214 (e.g., illustrated in FIGS. 2B-2H) positioned according to a floating configuration between the first external flange 205 and the second external flange 201. The inner floating frame assembly 214 comprises an inner floating box frame 202 attached to a first internal flange 203 (e.g., positioned on a first side of the inner floating frame assembly 214 that is to face towards 215 the enclosure door 104) and a second internal flange 210 (e.g., positioned on a second side of the inner floating frame assembly 214 that is to face towards 217 the circuit breaker 108). The inner floating frame assembly 214 comprises an inner floating frame 204 positioned between the first internal flange 203 and the second internal flange 210. For example, the inner floating frame 204 may move between the first internal flange 203 and the second internal flange 210 (e.g., and/or the inner floating box frame 202 may move with respect to the inner floating frame 204) so that the inner floating frame assembly 214 may move in response to movement of the circuit breaker 108 while maintaining the seal between circuit breaker 108 and the enclosure door 104 (e.g., the seal may be formed by the second internal flange 210 being held against the front side 110 of the circuit breaker 108 by one or more adjustable couplings (e.g., a first spring 206, a second spring 208, and/or other springs illustrated in FIGS. 2B-2G)).

In an example, one or more additional extensions may be positioned between the first external flange 205 and the second external flange 201 to accommodate various sized gaps between enclosure doors and circuit breakers that are to be sealed by the adjustable door assembly 200. For example, a first extension 207 and a second extension 209 may be added between the first external flange 205 and the second external flange 201 to accommodate a relatively larger gap. It may be appreciated that any number and/or size (e.g., thickness) of extensions may be added or removed to accommodate various sized gaps. In an example where the adjustable door assembly 200 is comprised of the metal material, the first extension 207 and/or the second extension 209 may comprise flange extensions that may attach to the adjustable door assembly 200 by an attachment means such as by using bolts. In an example where the adjustable door assembly is comprised of the polymer material, the first extension 207 and/or the second extension 209 may comprise snap-fit extensions that may attach to the adjustable door assembly 200 by an attachment means such as by snapping onto the adjustable door assembly 200.

Figure 2B:
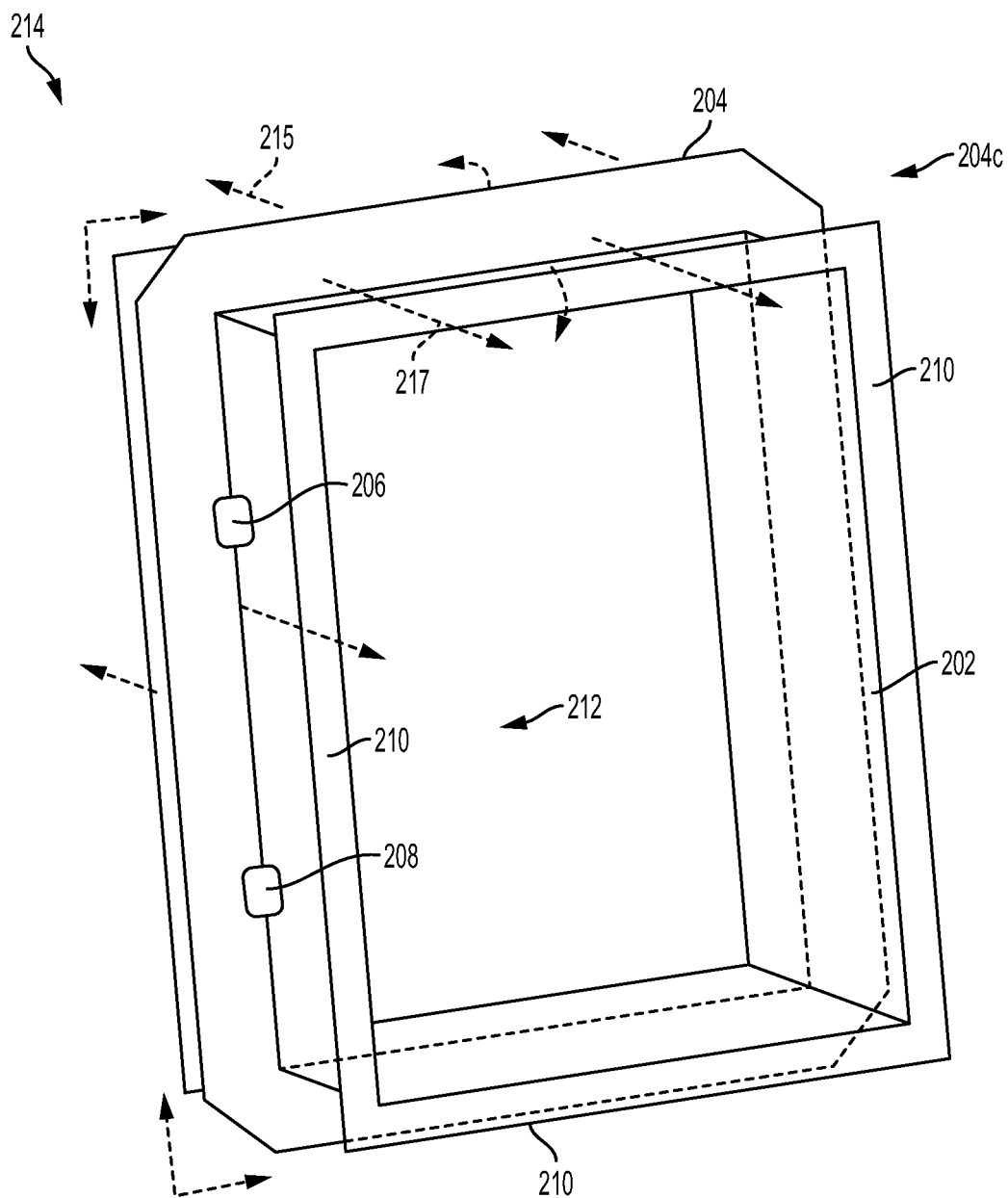
FIG. 2B is an illustration of an inner floating frame assembly comprising one or more adjustable couplings.
Figure 2C:
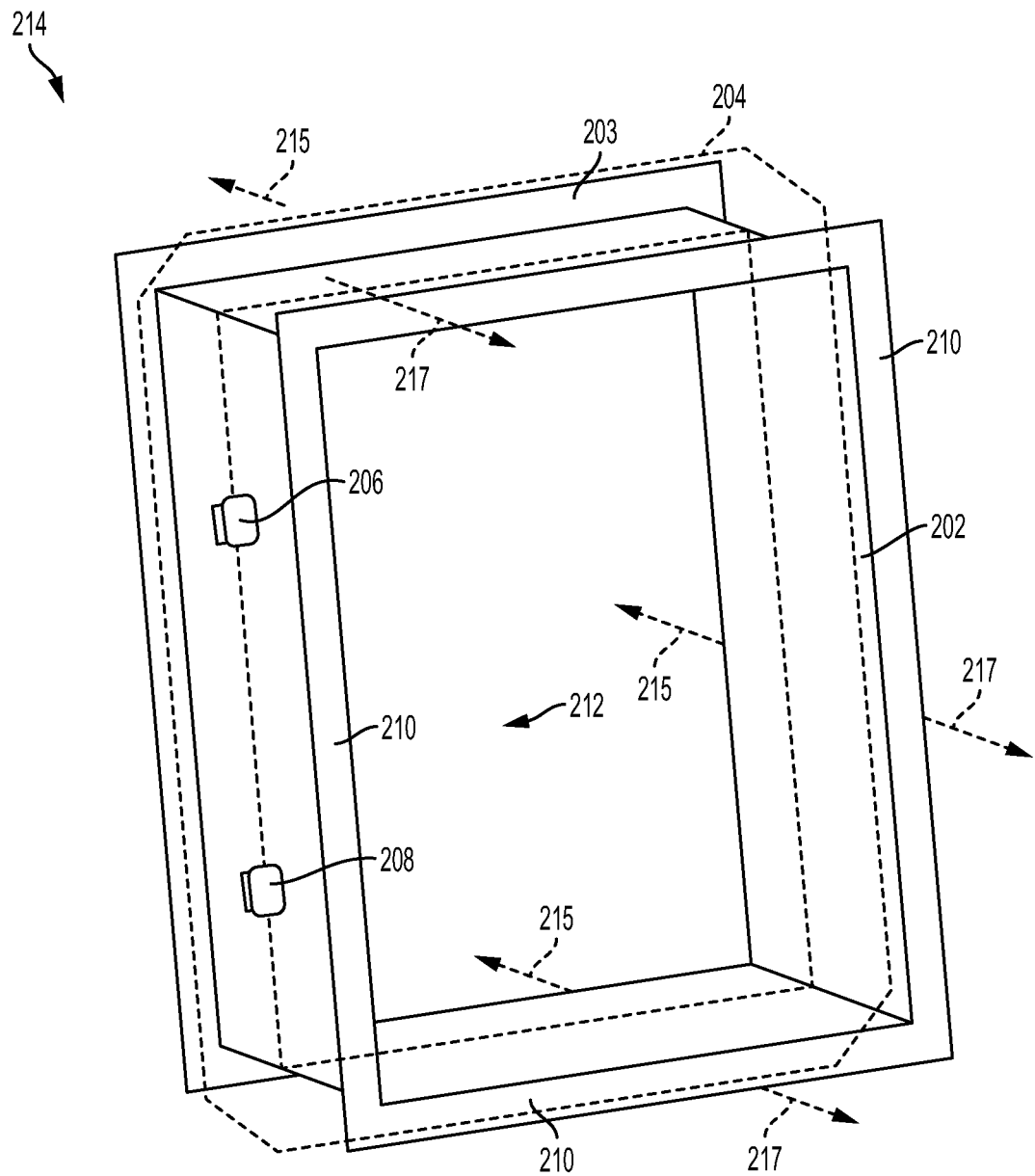
FIG. 2C is an illustration of an inner floating frame assembly.
Figure 2D:
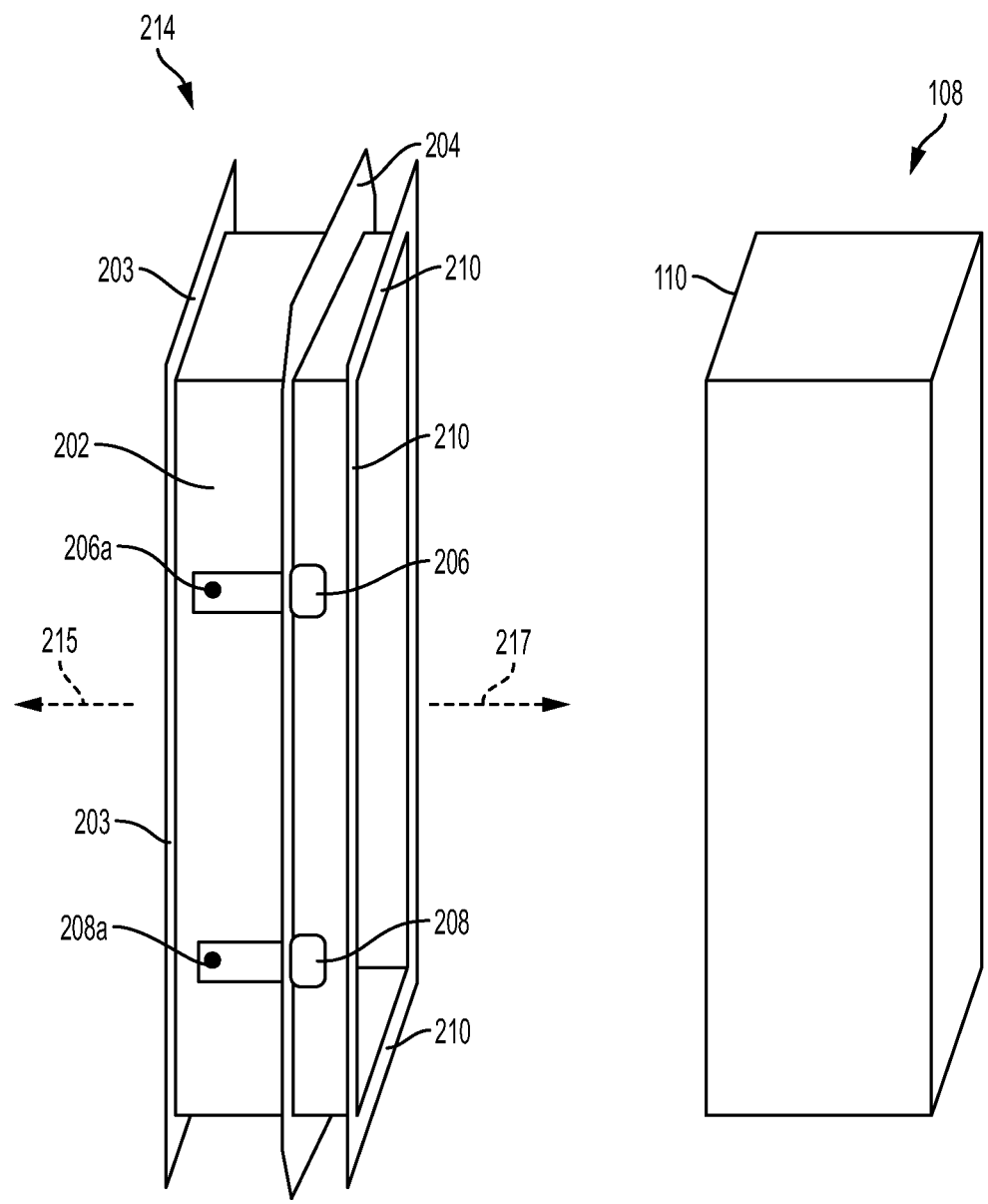
FIG. 2D is an illustration of an inner floating frame assembly configured to positionally adjust based upon movement of a circuit breaker.

FIG. 2B illustrates an example of the inner floating frame assembly 214 comprising one or more adjustable couplings, such as a first spring 206, a second spring 208, and/or other springs (e.g., roll springs that provide linear adjustability, compression springs, etc.) or coupling means not illustrated. The one or more adjustable couplings may be configured to apply a force to the inner floating box frame 202 (e.g., the first side of the inner floating box frame 202 on which the first internal flange 203 is attached) towards the inner floating frame 204 to form a seal between the front side 110 of the circuit breaker 108 and the enclosure door 104. The force may push the inner floating box frame 202 (e.g., the second side of the inner floating box frame 202 on which the second external flange 210 is attached) towards 217 the circuit breaker 108, thus creating the seal between the inner floating box frame 202 and the circuit breaker 108. For example, the second internal flange 210 may be positioned facing 217 towards the front side 110 of the circuit breaker 108 and the first internal flange 203 may be positioned facing 215 away from the circuit breaker 108, such as facing or protruding out from the enclosure door 104, as illustrated in FIGS. 2C and 2D. In this way, the first spring 206, the second spring 208, and/or other springs may force the inner floating box frame 202, such as the second internal flange 210, towards the front side 110 of the circuit breaker 108 to form the seal. For example, the seal may be formed around a perimeter of the front side 110 of the circuit breaker 108, which may provide a barrier between the backside of the circuit breaker 108 and the access opening 212 that provides access to the front side 110 of the circuit breaker 108 when the enclosure door 104 is closed, as illustrated in FIG. 2C where the inner floating frame 204 is illustrated in dashed lines for illustrative purposes.

Figure 2E:
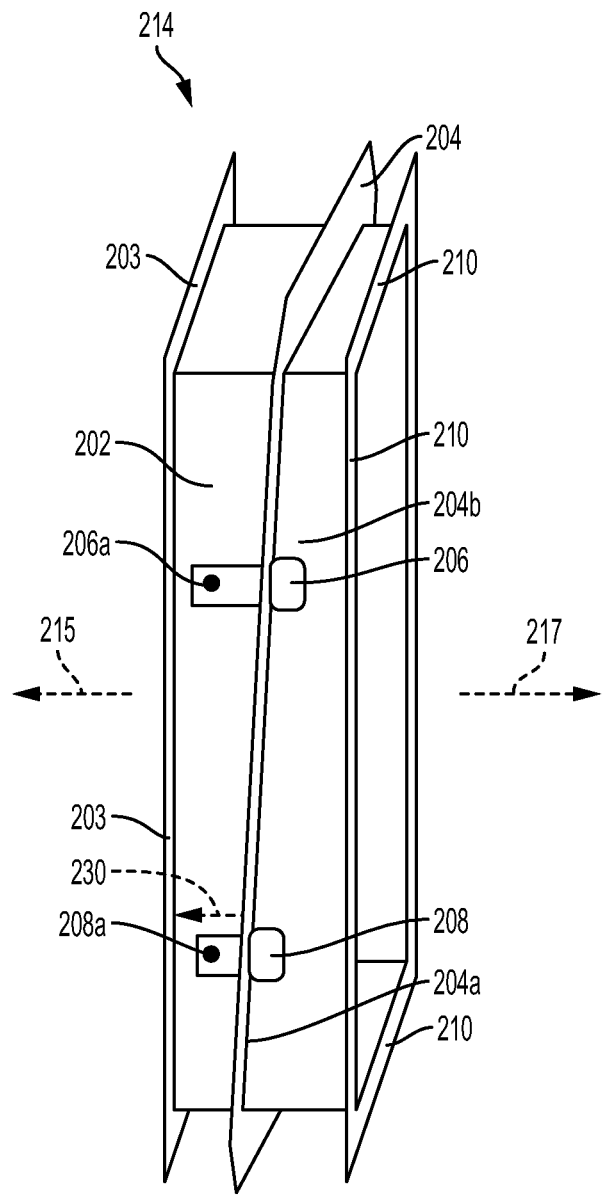
FIG. 2E is an illustration of an inner floating frame assembly comprising one or more adjustable couplings.

The adjustable couplings may be configured to provide positional adjustment of the inner floating frame assembly 214. For example, the inner floating frame 204 and/or the inner floating box frame 202 may linearly adjust, vertically adjust, horizontally adjust, diagonally adjust, tilt, turn, and/or move in any direction in response to movement of the circuit breaker 108, as illustrated in FIG. 2B by the dashed arrows. FIG. 2E illustrates the second spring 208 applying a pulling force 230 to a bottom inner floating frame portion 204a of the inner floating frame 204 towards a second spring attachment 208a used to attach the second spring 208 to the inner floating box frame 202, and thus the pulling force 230 may pull the inner floating box frame 202, at the second spring attachment 208a, towards the bottom inner floating frame portion 204a. The pulling force 230 may push the inner floating box frame 202 (e.g., the second side of the inner floating box frame 202 on which the second internal flange 210 is attached) towards 217 the circuit breaker 108, thus creating the seal between the inner floating box frame 202 and the circuit breaker 108.

Figure 2F:
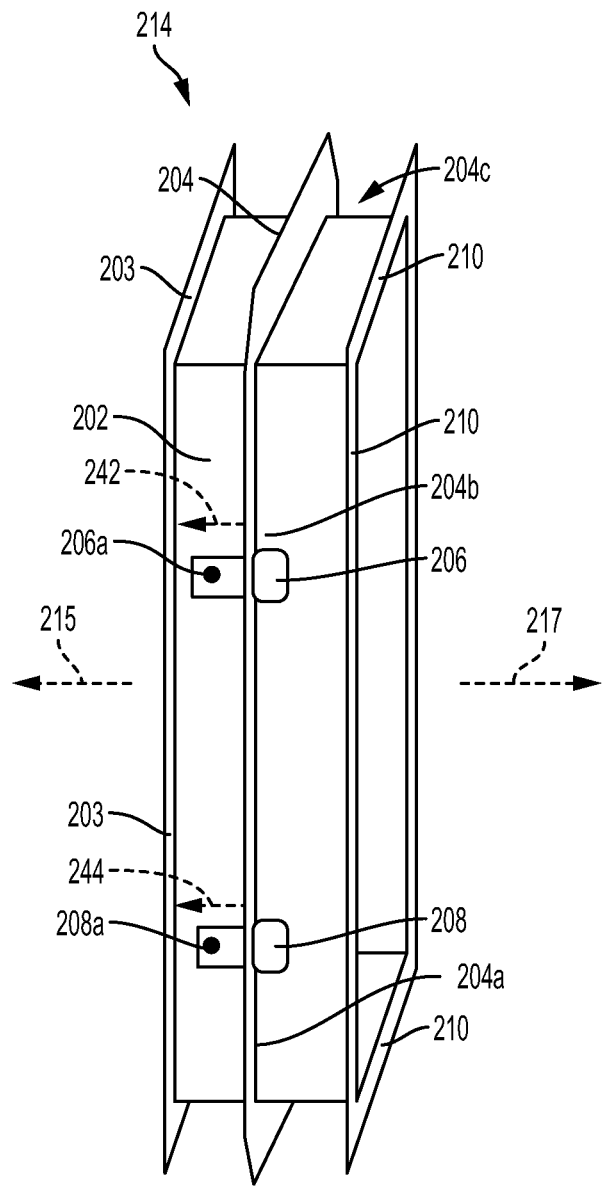
FIG. 2F is an illustration of an inner floating frame assembly comprising one or more adjustable couplings.

FIG. 2F illustrates the first spring 206 applying a first pulling force 242 to a top inner floating frame portion 204b of the inner floating frame 204 towards a first spring attachment 206a used to attach the first spring 206 to the inner floating box frame 202, and thus the first pulling force 242 may pull the inner floating box frame 202, at the first spring attachment 206a, towards the top inner floating frame portion 204b. The second spring 208 may apply a second pulling force 244 to the bottom inner floating frame portion 204a of the inner floating frame 204 towards the second spring attachment 208a, and thus the second pulling force 244 may pull the inner floating box frame 202, at the second spring attachment 208a, towards the bottom inner floating frame portion 204a. The first pulling force 242 and/or the second pulling force 244 may push the inner floating box frame 202 (e.g., the second side of the inner floating box frame 202 on which the second internal flange 210 is attached) towards 217 the circuit breaker 108, thus creating the seal between the inner floating box frame 202 and the circuit breaker 108.

Figure 2G:
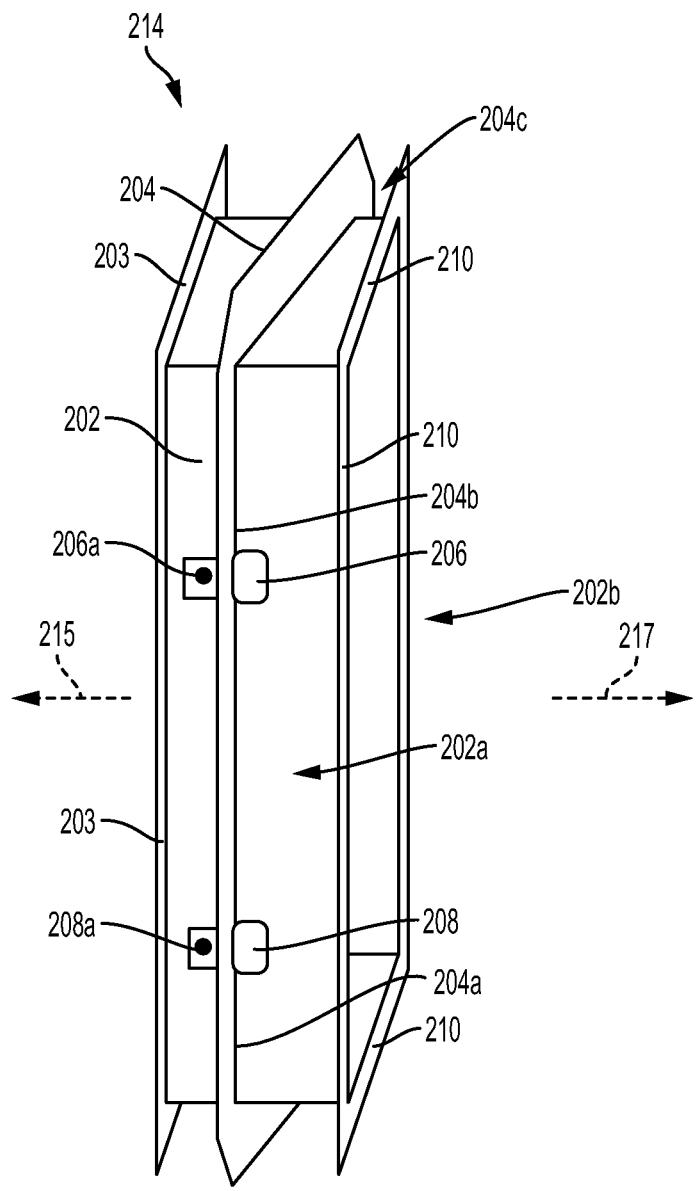
FIG. 2G is an illustration of an inner floating frame assembly comprising one or more adjustable couplings.

It may be appreciated that any number of adjustable couplings may be attached to various sides of the inner floating box frame 202. For example, the first spring 206 and the second spring 208 may be located on an outside portion of a first inner floating box frame side 202a of the inner floating box frame 202, as illustrated in FIG. 2G. A third spring and a fourth spring, not illustrated, may be located on an outside portion of a second inner floating box frame side 202b of the inner floating box frame 202 (e.g., located on a side opposite of the first inner floating box frame side 202a). The third spring and the first spring may be configured to apply pulling forces to a side inner floating frame portion 204c of the inner floating frame 204 towards a third spring attachment used to attach the third spring to the second inner floating box frame side 202b of the inner floating box frame 202 and towards a fourth spring attachment used to attach the fourth spring to the second inner floating box frame side 202b of the inner floating box frame 202. Thus, the pulling force may pull the inner floating box frame 202, at the third spring attachment and the fourth spring attachment, towards the side inner floating frame portion 204c of the inner floating frame 204. The pulling forces may push the inner floating box frame 202 (e.g., the second side of the inner floating box frame 202 on which the second internal flange 210 is attached) towards 217 the circuit breaker 108, thus creating the seal between the inner floating box frame 202 and the circuit breaker 108.

Figure 2H:
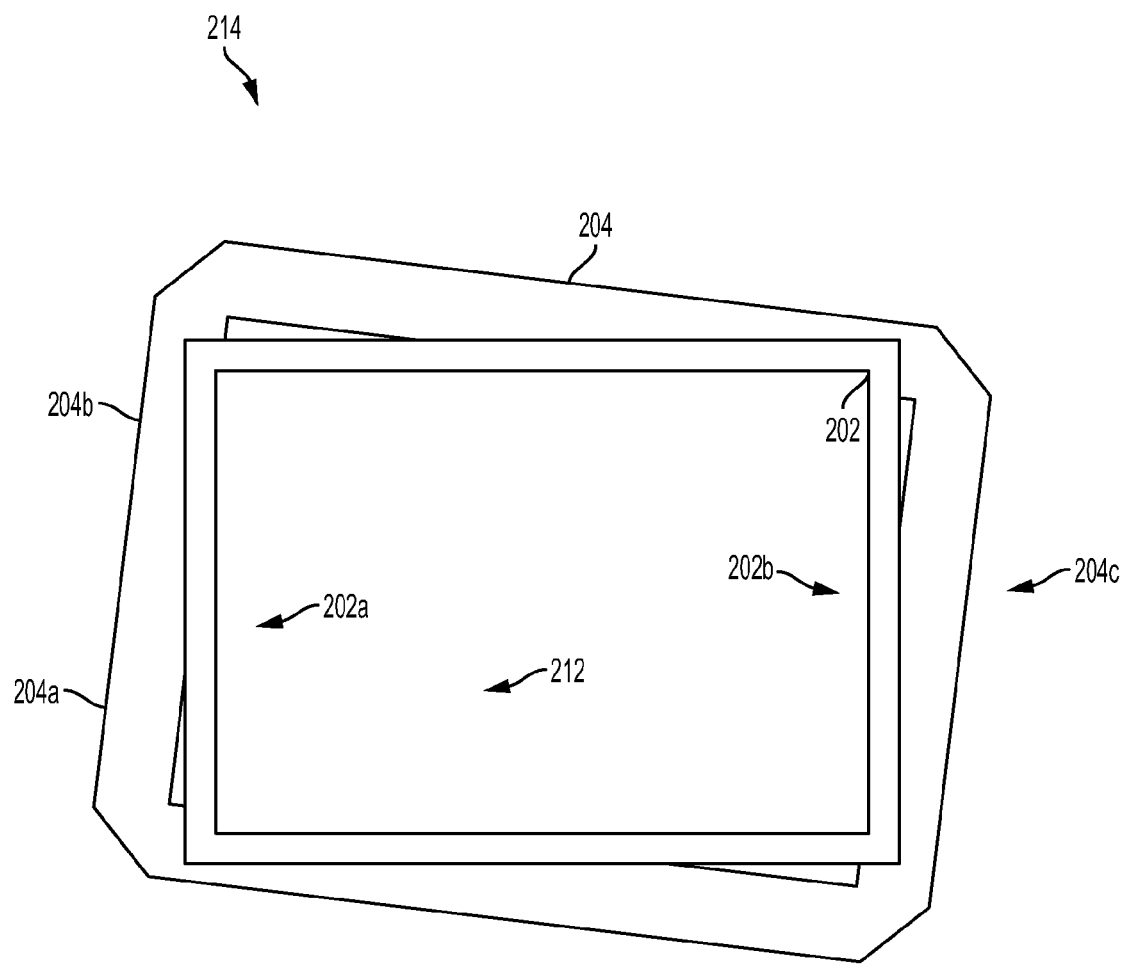
FIG. 2H is an illustration of an inner floating frame assembly.

FIG. 2F illustrates the third spring and the fourth spring pulling the side inner floating frame portion 204c of the inner floating frame 204 further towards the first internal flange 203 than the first spring 206 and the second spring 208 pulling the top inner floating frame portion 204b and the bottom inner floating frame portion 204a of the inner floating frame 204 towards the first internal flange 203. FIG. 2G illustrates the first spring 206 and the second spring 208 pulling the top inner floating frame portion 204b and the bottom inner floating frame portion 204a of the inner floating frame 204 further towards the first internal flange 203 than the third spring and the fourth spring pulling the side inner floating frame portion 204c of the inner floating frame 204 towards the first internal flange 203. FIG. 2H illustrates the inner floating box frame 202 tilting with respect to the inner floating frame 204. In this way, the inner floating frame assembly 214 may be configured to move in various directions based upon movement of the circuit breaker 108.

Figure 2I:
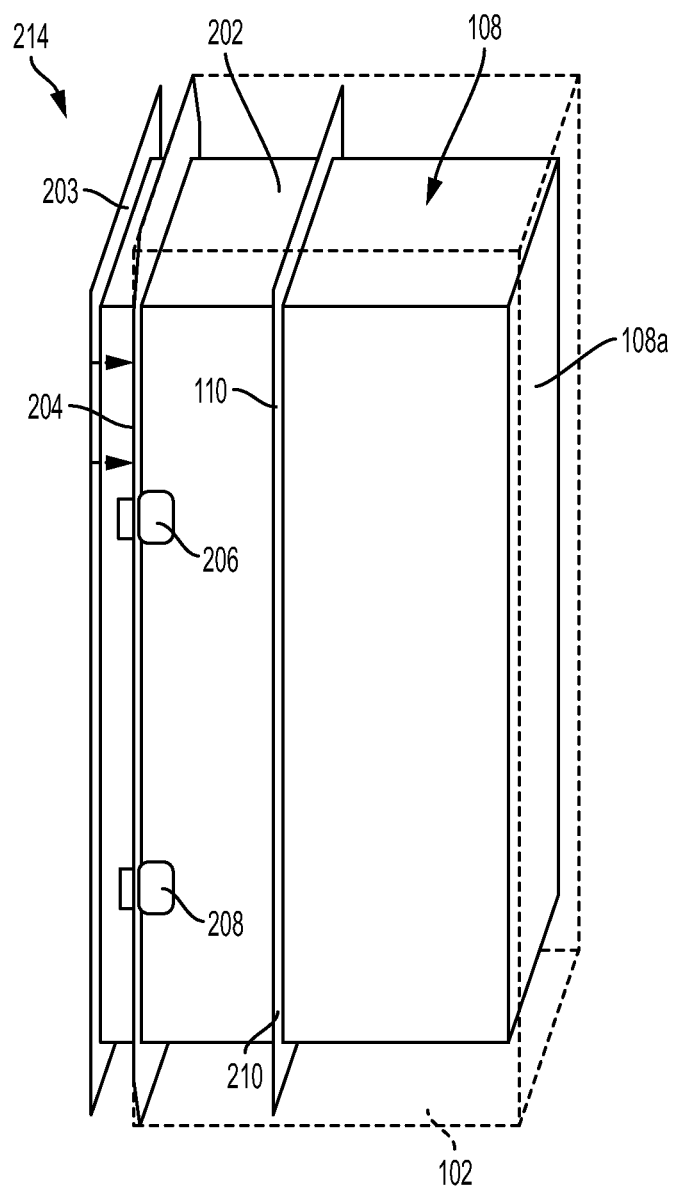
FIG. 2I is an illustration of an inner floating frame assembly configured to form a seal with a circuit breaker.

FIG. 2I illustrates the adjustable door assembly 214 forming a seal against the front side 110 of the circuit breaker 108 while the circuit breaker 208 is in a first position (e.g., a racked in position where the circuit breaker 108 is recessed within the enclosure 102). For example, the first spring 206, the second spring 208, and/or other springs may apply a force to the inner floating box frame 202 that pushes the inner floating box frame 202 towards the front side 110 of the circuit breaker 108, thus forming the seal between the second internal flange 210 and the front side 110 of the circuit breaker 108. The inner floating frame assembly 214 may be coupled, such as through one or more external flanges (e.g., the second external flange 201 of FIG. 2A), to the enclosure door 104 of the enclosure 102.

Figure 2J:
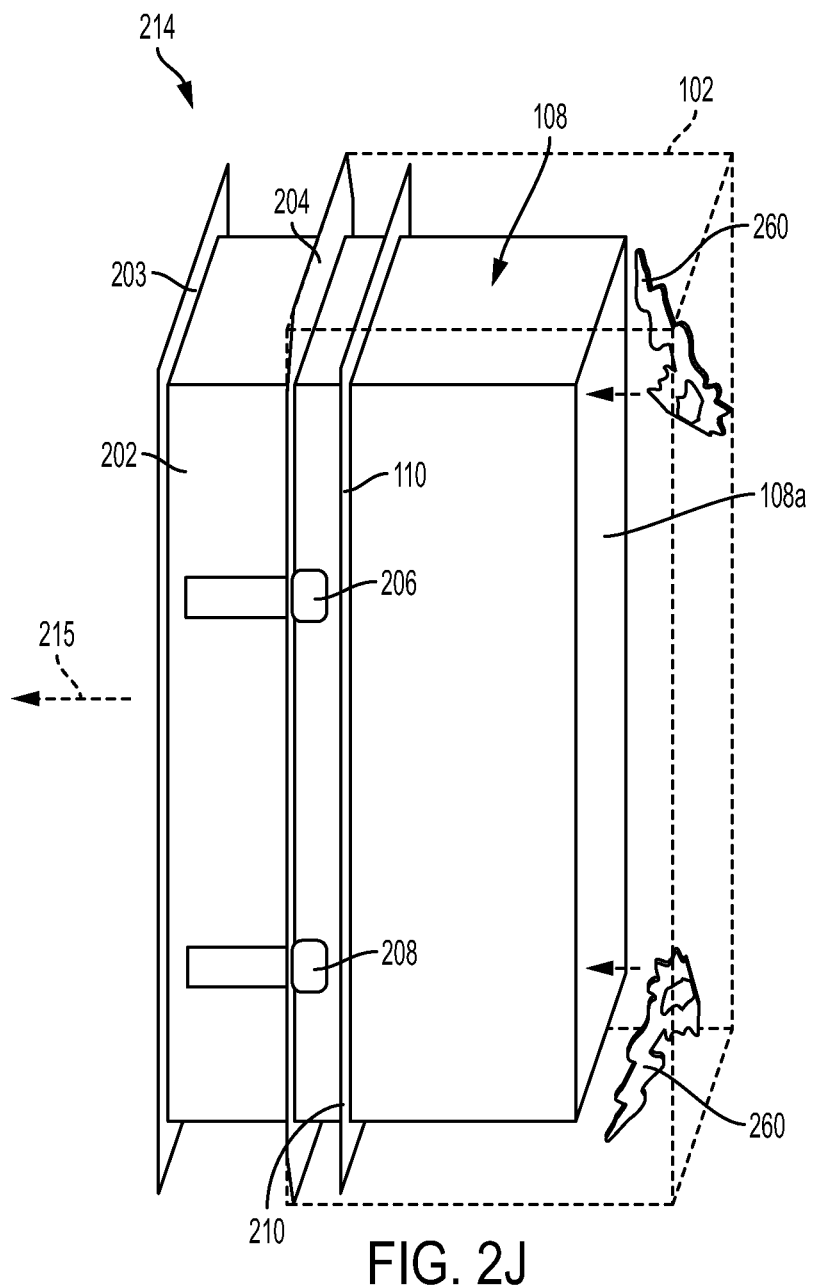
FIG. 2J is an illustration of an inner floating frame assembly configured to form a seal with a circuit breaker, where the seal mitigates exposure to an arc flash.

FIG. 2J illustrates the inner floating frame assembly 214 maintaining the seal against the front side 110 of the circuit breaker 108 when the circuit breaker 108 transitions from the first position to a second position (e.g., a racked out position where the inner floating box frame 202 may be pushed out by the circuit breaker 108, thus protruding through the enclosure door 104 of the enclosure 102). In this way, the inner floating frame assembly 214 may adjust, while maintaining the seal, to various positions when the circuit breaker 108 is in a connected position, a disconnected position, a test position, and/or transitioning between positions. The seal may be formed as a barrier for the gap 112 between the access opening 212 and a backside 108a of the circuit breaker 108. FIG. 2J illustrates the seal providing a barrier that may mitigate an arc flash 260, which may otherwise result in material, an explosive force, and/or a gas escaping the backside 108a of the circuit breaker 108 through the gap 112 and the access opening 212.

Figure 3A:
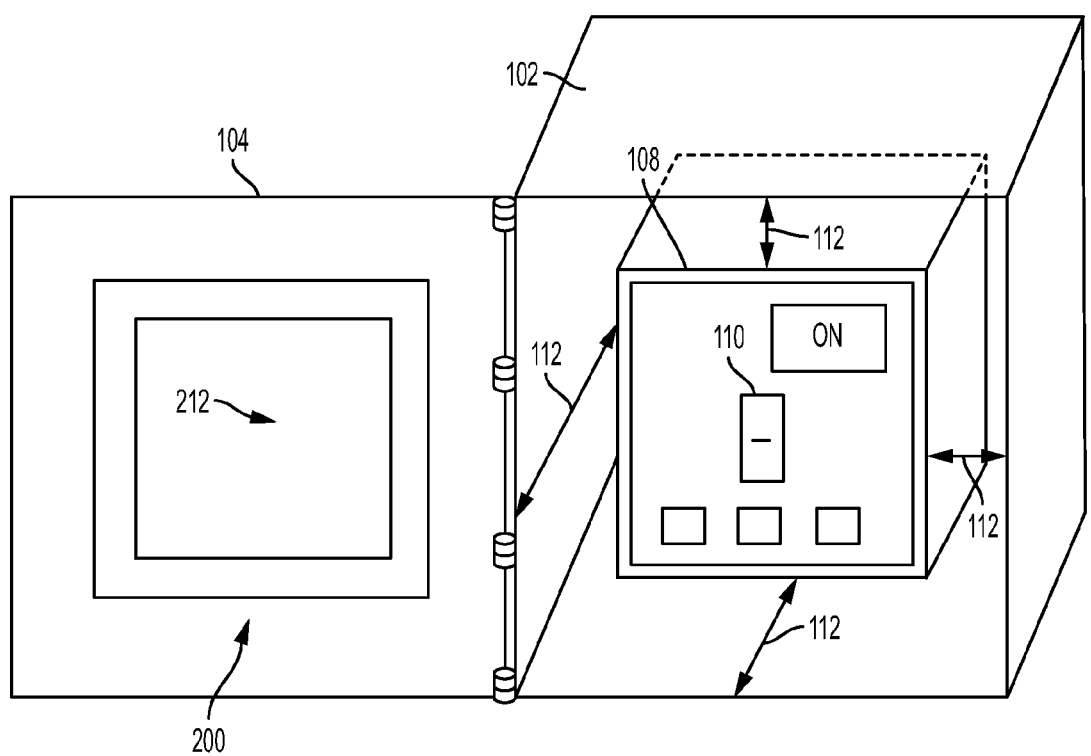
FIG. 3A is an illustration of an apparatus for forming a seal between a circuit breaker and an enclosure door, where the apparatus is attached to an enclosure door that is in an open position.
Figure 3B:
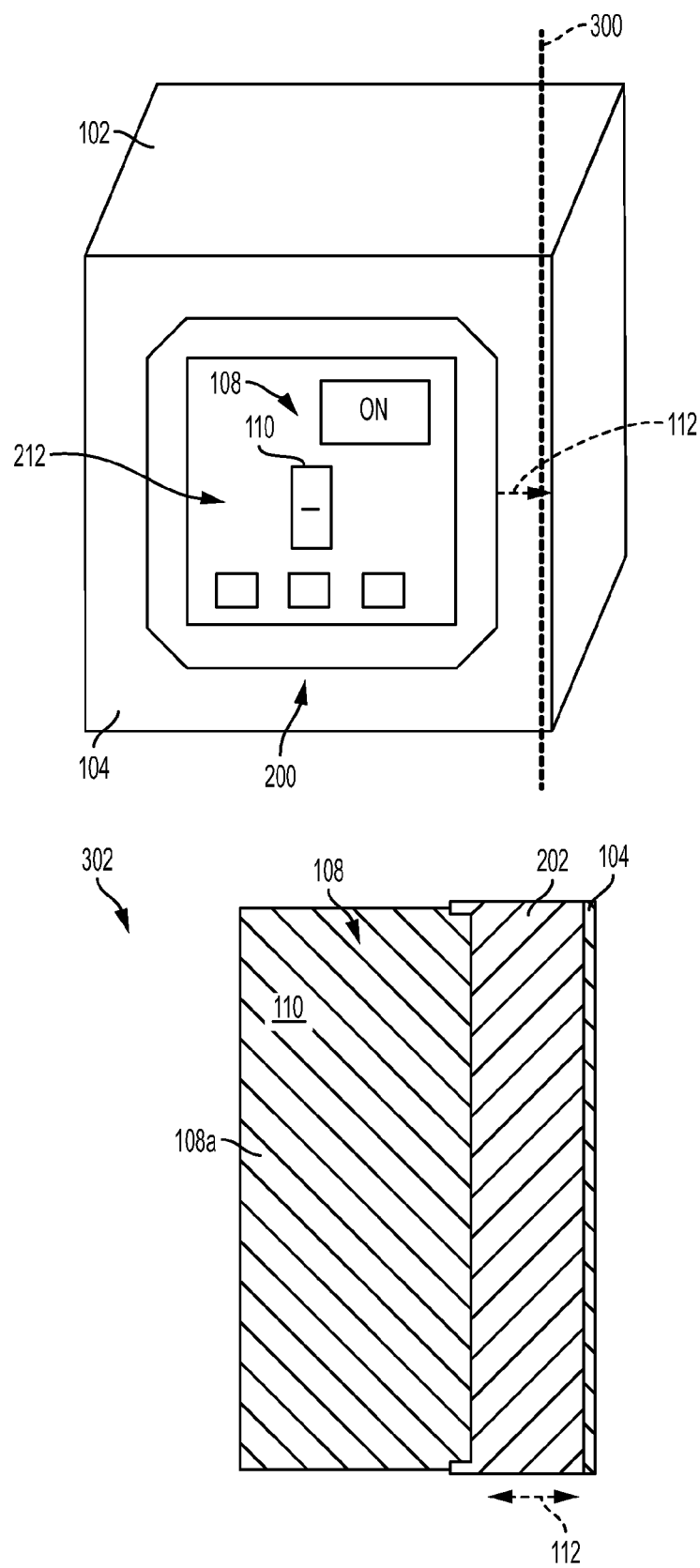
FIG. 3B is an illustration of an apparatus for forming a seal between a circuit breaker and an enclosure door, where the apparatus is attached to an enclosure door that is in a closed position while the circuit breaker is in a first position.
Figure 3C:
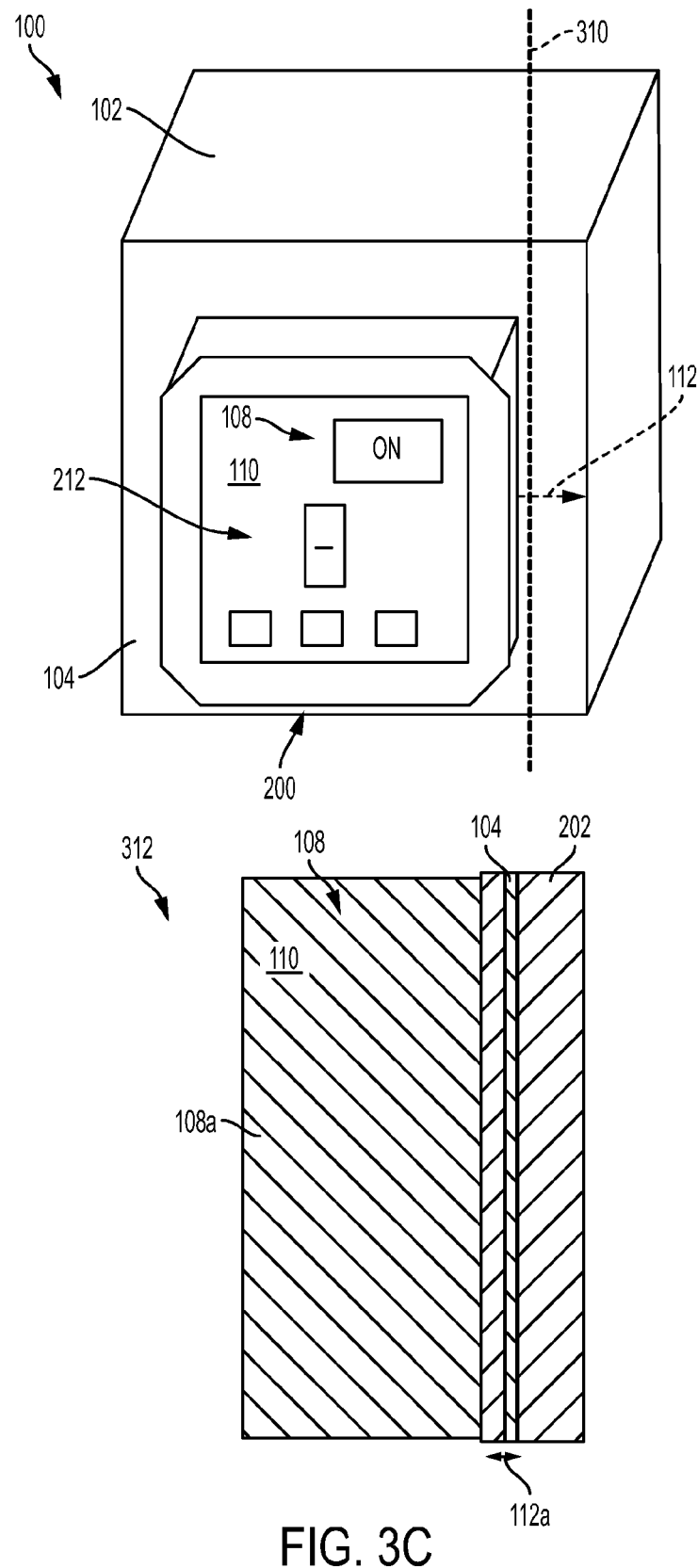
FIG. 3C is an illustration of an apparatus for forming a seal between a circuit breaker and an enclosure door, where the apparatus is attached to an enclosure door that is in a closed position and maintains a seal while the circuit breaker transitions from a first position to a second position.

FIGS. 3A-3C illustrate examples of the adjustable door assembly 200 attached to the enclosure door 104 of the enclosure 102. FIG. 3A illustrates the adjustable door assembly 200 attached to the enclosure door 104 while the enclosure door 204 is opened and the circuit breaker 108 is in a recessed position (e.g., a connected position where the circuit breaker 108 is carrying current). In an example, the inner floating frame assembly 214 has a depth that is greater than or equal to the gap 112 so that the inner floating frame assembly 214 can form a seal between the front side 110 of the circuit breaker 108 and the enclosure door 104 when the enclosure door 104 is closed.

FIG. 3B illustrates the adjustable door assembly 200 attached to the enclosure door 104 while the enclosure door 104 is closed and the circuit breaker 108 is in the recessed position. The adjustable door assembly 200 may form the seal between the front side 110 of the circuit breaker 108 and the enclosure door 104. The circuit breaker 108 may be accessible through the access opening 212. FIG. 3B illustrates a cross-sectional view 302 of the enclosure 102 taken along a line 300. The cross-sectional view 302 illustrates the inner floating box frame 202 filling the gap 112 between the front side 110 of the circuit breaker 108 and the enclosure door 104, thus forming the seal between the access opening 112 and the backside 108a of the circuit breaker 108.

FIG. 3C illustrates the adjustable door assembly 200, such as the inner floating frame assembly 202, moving based upon movement of the circuit breaker 108, while maintain the seal between the access opening 112 and the backside 108a of the circuit breaker 108. For example, the circuit breaker 108 may transition from the recessed position (e.g., the connected position) to a disconnected position (e.g., the circuit breaker 108 may rack out towards the enclosure door 104). FIG. 3C illustrates a cross-sectional view 312 of the enclosure 102 taken along a line 310. The inner floating frame assembly 214, such as the inner floating box frame 202, may be pushed by the circuit breaker 108 towards the enclosure door 104, thus resulting the inner floating box frame 200 protruding through the enclosure door 104. The adjustable couplings, such as the first spring 106, the second spring 208, and/or other springs, may apply a force to the inner floating box frame 202 towards the front side 110 of the circuit breaker 108 in order to maintain the seal that provides a barrier (e.g., sealing a gap 112a between the front side 110 of the circuit breaker 108 and the enclosure door 104) that may mitigate exposure to an arc flash from the backside 108a of the circuit breaker 108, which may otherwise result in material, an explosive force, and/or a gases escaping the backside 108*a* of the circuit breaker 108 through the access opening 212.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An apparatus for forming a seal between a circuit breaker and an enclosure, comprising:
    an adjustable door assembly comprising:
        a first external flange to attach to an enclosure door of the enclosure that houses the circuit breaker;
        a second external flange to attach to the enclosure door;
        an inner floating frame assembly, positioned according to a floating configuration between the first external flange and the second external flange, the inner floating frame assembly comprising:
            an inner floating frame;
            an inner floating box frame; and
            an adjustable coupling that applies a force, between the inner floating frame and the inner floating box frame, to the inner floating box frame towards a front side of the circuit breaker to form the seal between the front side of the circuit breaker and the enclosure door, the adjustable coupling comprising a spring attached to the inner floating box frame, the force applied by the adjustable coupling maintaining the seal after a positional change of the circuit breaker; and
        an access opening providing access to the front side of the circuit breaker when the enclosure door is closed.

2. The apparatus of claim 1, the seal formed between the access opening and a backside of the circuit breaker.

3. The apparatus of claim 1, the seal to provide a barrier for mitigating at least one of an arc flash, material, an explosive force, or a gas from escaping a backside of the circuit breaker through the access opening.

4. The apparatus of claim 1, the adjustable coupling comprising one or more additional springs attached to the inner floating box frame.

5. The apparatus of claim 1, the adjustable coupling to provide positional adjustment of the inner floating frame assembly.

6. The apparatus of claim 5, the positional adjustment comprising at least one of linear adjustment, vertical adjustment, horizontal adjustment, or diagonal adjustment.

7. The apparatus of claim 1, the inner floating frame assembly to adjust to a first position when the circuit breaker is in a connected position.

8. The apparatus of claim 7, the inner floating frame assembly to adjust from the first position to a second position when the circuit breaker transitions from the connected position to a disconnected position.

9. The apparatus of claim 8, the inner floating frame assembly to adjust to a third position when the circuit breaker is in a test position.

10. The apparatus of claim 8, the inner floating frame assembly protruding through the enclosure door while in the second position.

11. The apparatus of claim 1, the inner floating box frame having a depth greater than or equal to a distance between the front side of the circuit breaker and the enclosure door.

12. The apparatus of claim 1, the inner floating frame assembly to maintain the seal when the circuit breaker transitions into at least one of a connected position, a disconnected position, or a test position.

13. The apparatus of claim 1, the inner floating frame assembly to maintain the seal when the circuit breaker transitions from a first position to a second position.

14. The apparatus of claim 1, the adjustable door assembly comprised of a metal material.

15. The apparatus of claim 14, the adjustable door assembly comprising one or more flange extensions positioned between the first external flange and the second external flange.

16. The apparatus of claim 1, the adjustable door assembly comprised of a polymer material.

17. The apparatus of claim 16, the adjustable door assembly comprising one or more snap-fit extensions positioned between the first external flange and the second external flange.

18. An apparatus for forming a seal between a circuit breaker and an enclosure, comprising:
    an adjustable door assembly comprising:

a first external flange to attach to an enclosure door of the enclosure that houses the circuit breaker;

a second external flange to attach to the enclosure door; and an inner floating frame assembly positioned according to a floating configuration between the first external flange and the second external flange, the inner floating frame assembly comprising:

an inner floating frame;

an inner floating box frame; and an adjustable coupling that applies a force, between the inner floating frame and the inner floating box frame, to the inner floating box frame towards a front side of the circuit breaker to form the seal between the front side of the circuit breaker and the enclosure door, the adjustable coupling comprising a spring attached to the inner floating box frame, the seal maintained when the circuit breaker transitions between at least one of a connected position, a disconnected position, or a test position.

19. The apparatus of claim 18, the adjustable coupling to provide positional adjustment of the inner floating frame assembly, the positional adjustment comprising at least one of linear adjustment, vertical adjustment, horizontal adjustment, or diagonal adjustment.

20. An apparatus for forming a seal between a circuit breaker and an enclosure, comprising:

an adjustable door assembly comprising:

a first external flange to attach to an enclosure door of the enclosure that houses the circuit breaker;

a second external flange to attach to the enclosure door; and an inner floating frame assembly, positioned according to a floating configuration between the first external flange and the second external flange, the inner floating frame assembly comprising:

an inner floating frame;

an inner floating box frame; and an adjustable coupling that applies a force, between the inner floating frame and the inner floating box frame, to the inner floating box frame towards a front side of the circuit breaker to form the seal between the front side of the circuit breaker and the enclosure door, the adjustable coupling comprising one or more springs attached to the inner floating box frame, the force applied by the adjustable coupling maintaining the seal after a positional change of the circuit breaker.

* * * * *